US008154601B2

(12) United States Patent  
Sasai et al.

(10) Patent No.: US 8,154,601 B2
(45) Date of Patent: Apr. 10, 2012

(54) TELEVISION RECEIVING SYSTEM (75) Inventors: Akira Sasai, Osaka (JP); Yoshikatsu Hattori, Kyoto (JP)

(73) Assignee: Panasonic Corporation, Osaka (JP)

( * ) Notice: Subject to any disclaimer, the term of this patent is extended or adjusted under 35 U.S.C. 154(b) by 611 days.

(21) Appl. No.: 11/817,906

(22) PCT Filed: Mar. 7, 2006

(86) PCT No.: PCT/JP2006/304337
§ 371 (c)(1),
(2), (4) Date: Sep. 6, 2007

(87) PCT Pub. No.: WO2006/095717
PCT Pub. Date: Sep. 14, 2006

(65) Prior Publication Data
US 2009/0049499 A1 Feb. 19, 2009

(30) Foreign Application Priority Data
Mar. 10, 2005 (JP) ................. 2005-066954

(51) Int. Cl.
*H04N 17/00* (2006.01)
*H04N 17/02* (2006.01)

(52) U.S. Cl. ........ 348/180; 348/569; 348/552; 348/558; 725/81; 725/133; 725/62; 455/226.1; 455/226.2; 455/226.4

(58) Field of Classification Search .................. None
See application file for complete search history.

(56) References Cited

U.S. PATENT DOCUMENTS

| 7,636,132 | B2 * | 12/2009 | Sakamoto | ............ 348/723 |
| 7,853,977 | B2 | 12/2010 | Sakamoto | |
| 2003/0072257 | A1 | 4/2003 | Ikedo et al. | |
| 2004/0003051 | A1 | 1/2004 | Krzyzanowski et al. | |
| 2004/0193647 | A1 | 9/2004 | Ueda | |
| 2005/0028208 | A1 * | 2/2005 | Ellis et al. | ............ 725/58 |
| 2005/0097618 | A1 * | 5/2005 | Arling et al. | ............ 725/114 |
| 2005/0210515 | A1 * | 9/2005 | Roh et al. | ............ 725/81 |
| 2006/0258291 | A1 * | 11/2006 | Nakata et al. | ............ 455/67.11 |
| 2007/0032198 | A1 * | 2/2007 | Sakamoto | ............ 455/69 |
| 2007/0044025 | A1 * | 2/2007 | Sakamoto | ............ 715/734 |
| 2007/0060152 | A1 | 3/2007 | Sakamoto | |

FOREIGN PATENT DOCUMENTS

| EP | 1 489 788 A2 | 12/2004 |
| EP | 1 617 596 A1 | 1/2006 |
| EP | 1 617 648 A1 | 1/2006 |
| EP | 1 622 360 A1 | 2/2006 |
| JP | 2001-358966 A | 12/2001 |
| JP | 2004-343725 A | 2/2004 |
| JP | 2004-336722 A | 11/2004 |
| JP | 2004-336724 A | 11/2004 |
| JP | 2004-336724 A | 11/2004 |
| JP | 2004-343725 A | 12/2004 |
| WO | WO-03007594 A1 | 1/2003 |

OTHER PUBLICATIONS

Supplementary European Search Report for EP 06 72 8706 dated Jan. 26, 2010. International Search Report for application No. PCT/JP2006/304337 dated Jun. 6, 2006.
Supplementary European Search Report for Application No. EP 06 72 8706, Feb. 2, 2010, Panasonic Corporation.
EP Office Action for 06-728706.0-2202, Mar. 30, 2011.

\* cited by examiner

*Primary Examiner* — Joseph P Hirl
*Assistant Examiner* — Fred Peng
(74) *Attorney, Agent, or Firm* — RatnerPrestia (57) ABSTRACT

A television receiving system has a plurality of setup-data including wireless settings, which can be selected by user's choice the optimum wireless setting for every position where the display is located. This configuration can create a stable signal-receiving environment no matter where the display is located.

7 Claims, 10 Drawing Sheets

TELEVISION RECEIVING SYSTEM

THIS APPLICATION IS A U.S. NATIONAL PHASE APPLICATION OF PCT INTERNATIONAL APPLICATION PCT/JP2006/304337.

TECHNICAL FIELD

The present invention relates to a television receiving system that can receive and utilize broadcast signals such as television broadcasting via wireless transmission.

BACKGROUND ART

Japanese Patent Unexamined Publication No. 2001-358966 discloses a conventional system that has a tuner and a display disposed separately in which broadcast signals received in the tuner are sent to the display via wireless transmission to show the broadcast signals on the display.

The conventional television receiving system has sent the broadcast signals received by a single tuner to a single or a plurality of displays via wireless transmission. Only a single set of configuration parameters has been installed for the wireless transmission, it cannot be said, therefore, that the wireless transmission has always performed in an optimum condition for all displays disposed in different locations. For instance a display located near the tuner can receive broadcast signals correctly, on the other hand the receiving condition in a display located far away from the tuner may be unstable, causing difficulties often in receiving the broadcast signals due to worsened wave conditions or the like.

SUMMARY OF THE INVENTION

The television receiving system of the present invention includes:
an antenna to receive broadcast signals,
a tuner including;
a tuning device to tune the broadcast signals received by the antenna, an encoder to encode the broadcast signals received by the antenna, a first wireless communicator to transmit the broadcast signals encoded by the encoder as wireless signals, and a first controller to control tuning conditions of the tuning device,
and
a display including;
a second wireless communicator to receive the broadcast signals from the first wireless communicator, a decoder to decode the wireless signals received by the second wireless communicator as the broadcast signals, an image display to display the broadcast signals decoded by the decoder as images, an input device to input a user's commands, a setup-data creator to create setup-data of the tuner according to the input commands, a second storage to store the setup-data created, and a second controller to retrieve the setup-data from the second storage and send it to the first controller via the second wireless communicator and first wireless communicator,
wherein the first controller controls tuning condition of the tuning device according to the setup-data sent from the second controller.

In the television receiving system of the present invention, the display is provided with a plurality of setup-data including configuration parameters for wireless transmission, so that a user can select a setup-data capable of providing an optimum receiving condition according to the location of the display to send the setup-data to the tuner. This can result in a stable receiving environment no matter where the display is located.

DESCRIPTION OF THE REFERENCE MARKS 1, 13 tuner
2, 22 display
3 setup-data
101 first wireless communicator
102 tuning device
103 encoder
104 LED indicator
105 first controller
106 first storage
109 antenna
201 second wireless communicator
202 decoder
203 input device
204 setup-data creator
205 second storage
206 second controller
207 location detector
209 image display

DETAILED DESCRIPTION OF THE PREFERRED EMBODIMENTS

Exemplary Embodiment 1

Figure 1:
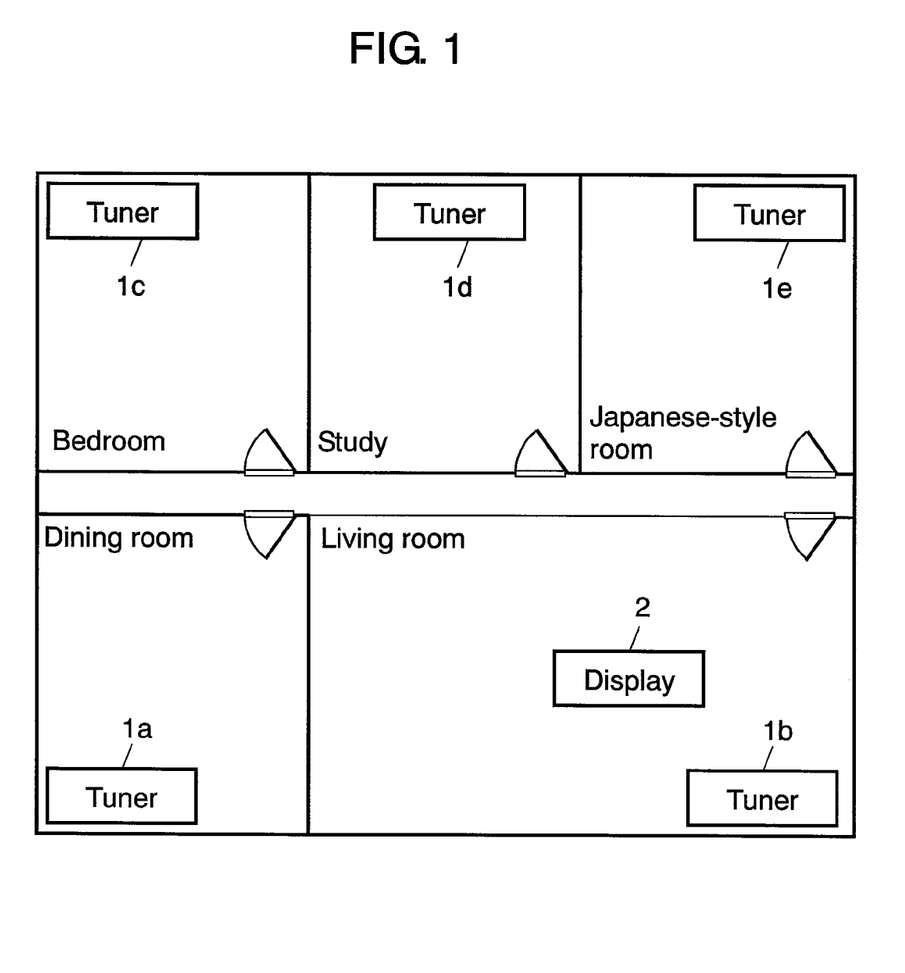
FIG. 1 shows an example of disposition of the tuners and display, when introduced in a home, of the television receiving system used in preferred embodiment 1 of the present invention.

FIG. 1 shows an example of disposition of the tuners and display, introduced in a home, of the television receiving system used in preferred embodiment 1 of the present invention. In FIG. 1, tuners 1a, 1b, 1c, 1d and 1e are disposed respective rooms, totaled five. One display 2 is disposed in the living room. In this case, display 2 communicates by wireless with tuner 1b, located nearest to it, in the living room. A plurality of displays 2 can be available.

Figure 2:
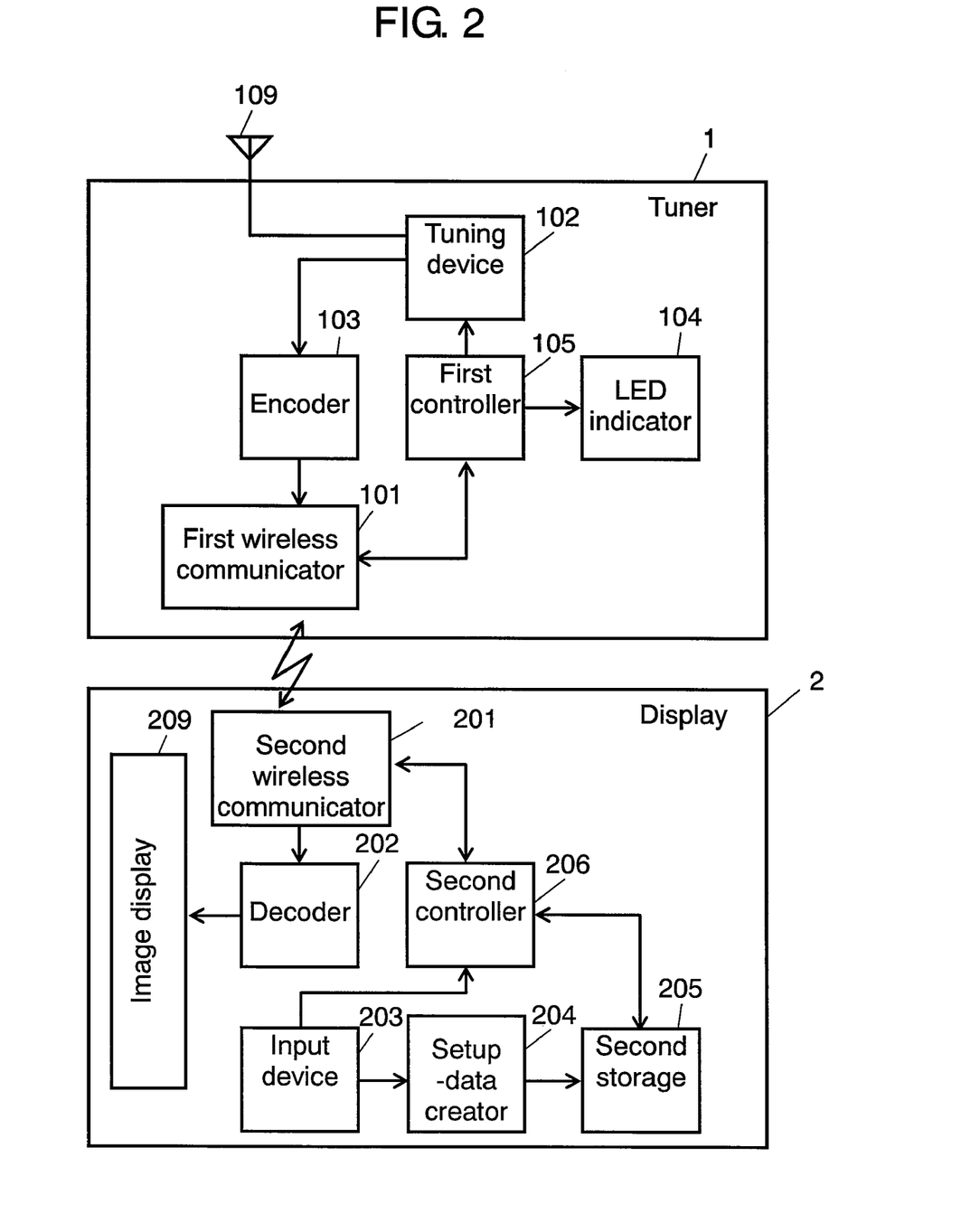
FIG. 2 shows a block diagram of the television receiving system used in preferred embodiment 1 of the present invention.

FIG. 2 shows a block diagram of the television receiving system used in preferred embodiment 1 of the present invention. The television receiving system comprises tuner 1 and display 2 both connected by wireless. Tuner 1 in FIG. 2 corresponds to tuner 1b in FIG. 1.

Tuner 1 comprises: first wireless communicator 101, tuning device 102, encoder 103, LED indicator 104, first controller 105 and antenna 109. Antenna 109 receives broadcast signals propagated from outside. Tuning device 102 tunes the broadcast signals received by antenna 109. Encoder 103 encodes the broadcast signals tuned by tuning device 102. First wireless communicator 101 transmits the broadcast signals encoded by encoder 103 as wireless signals.

As mentioned above, the broadcast signals are sent to display 2 as coded wireless signals. Other than controlling the series of processing, first controller 105 controls tuning conditions of tuning device 102. The tuning conditions differ in the location of tuners 1. First controller 105 controls communication conditions of first wireless communicator 101. The communication conditions are controlled according to setup-data stored in display 1 described later. LED indicator 104 shows a location data stored in the setup-data of tuner 1 by lighting LEDs.

Display 2 comprises: second wireless communicator 201, decoder 202, input device 203, setup-data creator 204, second storage 205, second controller 206 and image display 209. Second wireless communicator 201 receives wireless signals from first wireless communicator 101 of tuner 1. Decoder 202 decodes the wireless signals received by second wireless communicator 201 as broadcast signals. Image display 209 shows the broadcast signals decoded by decoder 202 as images. Input device 203 accepts commands input by a user of display 2. Setup-data creator 204 creates setup-data according to commands input from input device 203. Second storage 205 stores the setup-data created by setup-data creator 204. Second controller 206 retrieves setup-data from second storage 205 to send the setup-data to first controller 105 of tuner 1 via second wireless communicator 201 and first wireless communicator 101 of tuner 1.

The setup-data is described next.

The setup-data refers to configuration parameters that enable the system to send/receive wireless signals in an optimum condition between tuner 1 and display 2.

Figure 3:
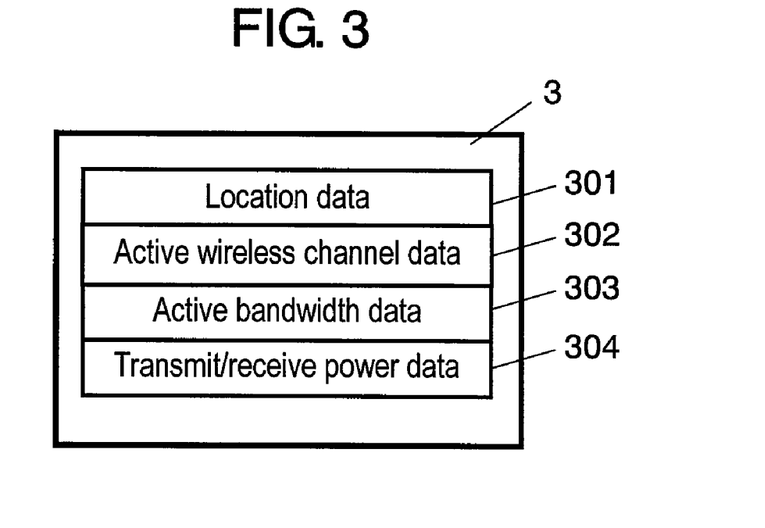
FIG. 3 shows an example of configuration parameters of the setup-data in tuner 1 included in the television receiving system used in preferred embodiment 1 of the present invention.

FIG. 3 shows an example of configuration parameters of the setup-data to form the television receiving system used in preferred embodiment 1 of the present invention. In FIG. 3, the configuration parameters of setup-data 3 include: location data 301, active wireless channel data 302, active bandwidth data 303 and transmit/receive power data 304. Location data 301 shows the position where display 2 is located, for instance dining room, living room, bedroom, study, Japanese-stile room or the like apply. Active wireless channel data 302 shows the wireless channel used for communication between first wireless communicator 101 of tuner 1 and second wireless communicator 201 of display 2. For instance if there are four wireless channels, channels 1, 2, 3 and 4 apply. Active bandwidth data 303 shows the bandwidth actually used in the wireless channel, for instance a case of channel 1 using a wide bandwidth ("WIDE") and using a narrow bandwidth (STANDARD or hereafter referred to as "STD") apply. Transmit/receive power data 304 shows the power consumed to transmit/receive signals in the wireless channel. For instance, the transmit/receive powers are thought to be lowered in case of good wireless communication condition (indicated as "LOW") and to be raised in case of worsened wireless communication condition (shown as "HIGH").

Figure 4:
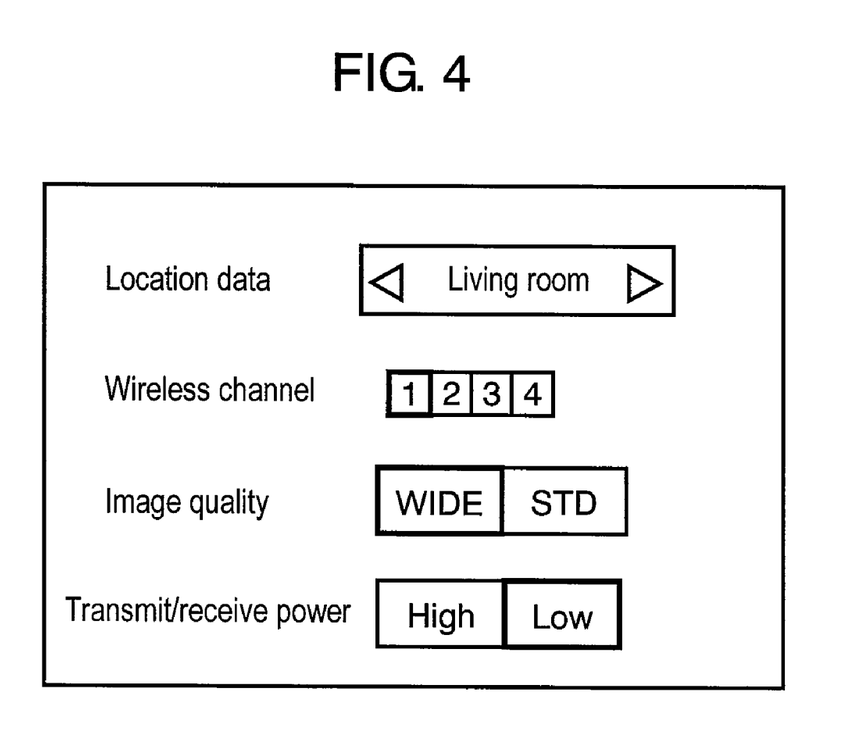
FIG. 4 shows an example of control-panel provided in the display of the television receiving system used in preferred embodiment 1 of the present invention.

FIG. 4 shows an example of input device 203 provided in display 2 of the television receiving system used in preferred embodiment 1 of the present invention. A control-panel screen, which is input device 203, shows configuration parameters as shown in FIG. 3. A touch panel overlies the display screen, so that a user can input setup-data directly on the screen by a fingertip. In FIG. 4, the location is installed as the living room, the active wireless channel as channel 1, the active bandwidth as "WIDE" and the transmit/receive power as "LOW" respectively. The bandwidth affects greatly on image quality, therefore the configuration parameter is titled as "image quality". The location can be selected by touching the triangle marks on both sides.

Figure 5:
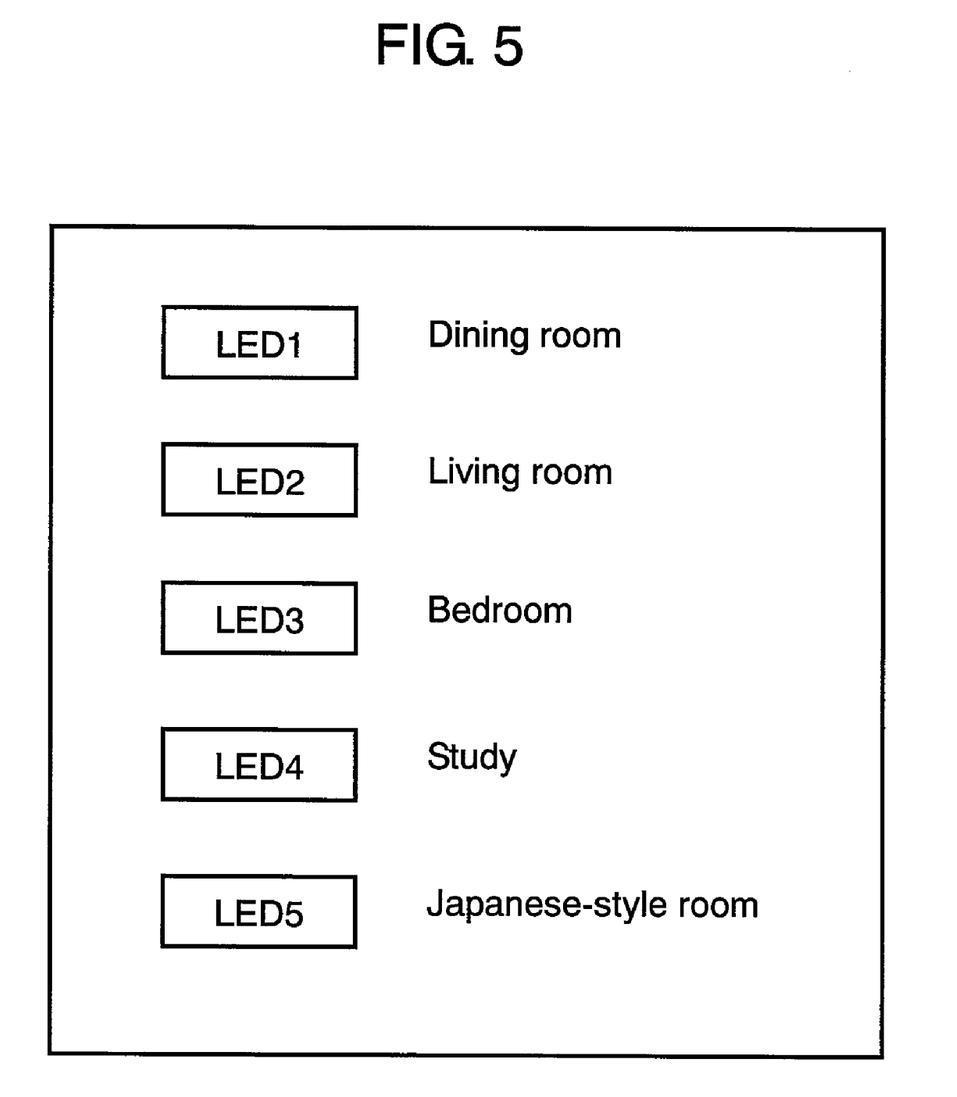
FIG. 5 shows an example of LED indicator provided in the tuner of the television receiving system used in preferred embodiment 1 of the present invention.

FIG. 5 shows an example of LED indicator 104 provided on tuner 1 of the television receiving system used in preferred embodiment 1 of the present invention. Location data 301, one of setup-data 3, is indicated. In FIG. 5, LED 2 is lit showing that display 2 is located in the living room.

As described above, to show crisp images in display 2 by receiving wireless signals from tuner 1 in an optimum condition, a user can install the optimum setup-data 3 personally. The optimum setup-data installed is sent from display 2 to tuner 1 by wireless.

Figure 6:
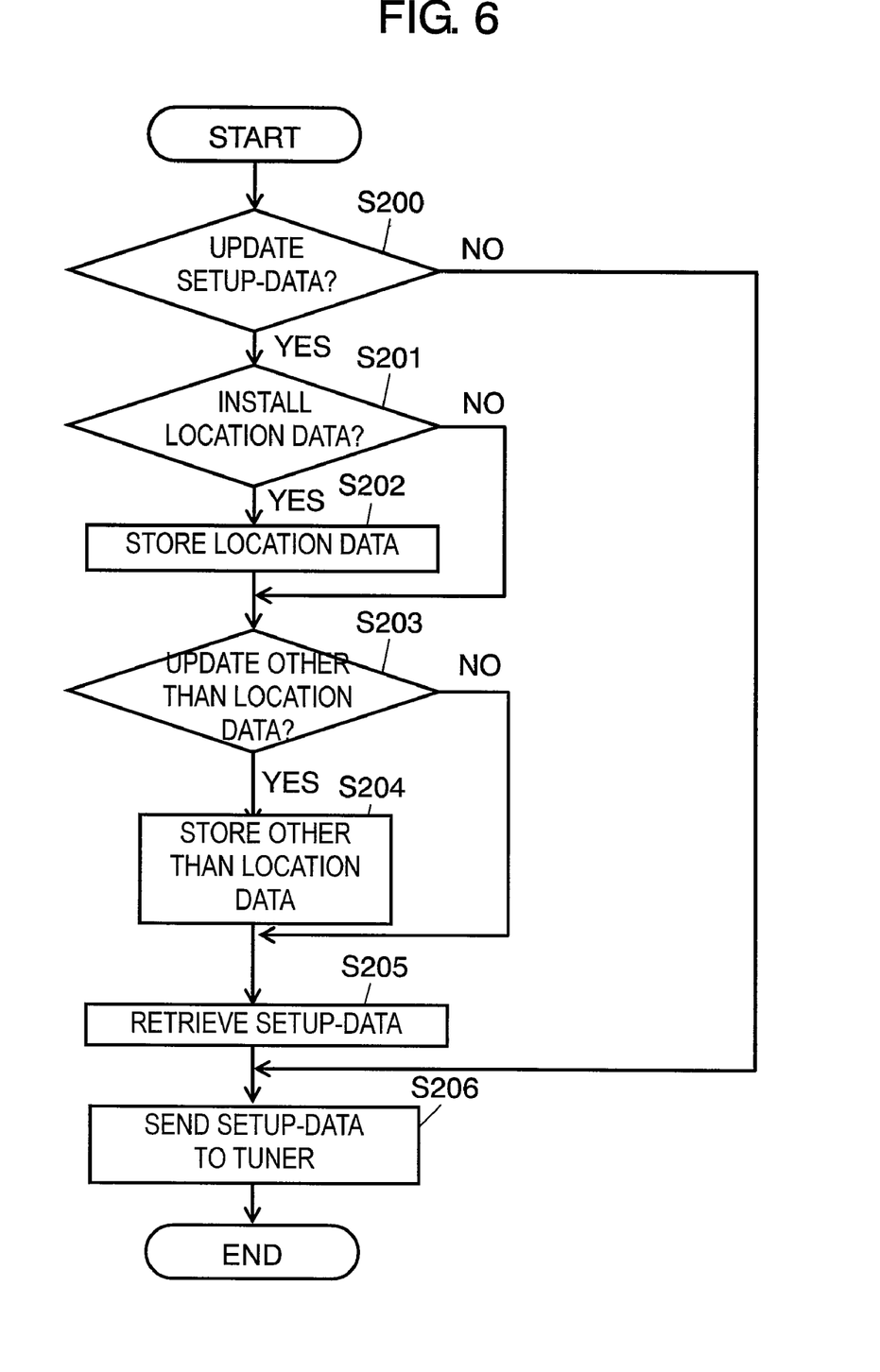
FIG. 6 shows a flowchart on setup-data executed in the display of the television receiving system used in preferred embodiment 1 of the present invention.

The operation is described next with reference to the flowchart. FIG. 6 shows the flowchart on setup-data executed in the display of the television receiving system used in preferred embodiment 1 of the present invention. When display 2 cannot adapt to the setup-data that has been stored previously (for instance when display 2 has moved to a new location or the like), new setup-data 3 should be installed according to the following procedures:

[1] Check whether setup-data 3 of display 2 should be updated or not (S200). If not, exit from the loop and go to step S206.

[2] If setup-data 3 is to be updated, check whether location data 301 commanded by a user from the control-panel of display 2 should be installed newly or not (S201). If location data 301 of display 2 is not to be installed newly, go to step S203.

[3] When location data 301 of display 2 is to be installed newly, the user should store the new location data 301 in second storage 205 (S202).

[4] Additionally, check whether the configuration parameters on wireless signal control in setup-data 3 should be updated or not (S203). If the configuration parameters on wireless signal control are not updated, go to step S205.

[5] When the configuration parameters on wireless signal control are updated, the user should store active wireless channel data 302, active bandwidth data 303 and transmit/receive power data 304 in second storage 205 (S204).

[6] Retrieve from second storage 205: location data 301 stored in step 202; and active wireless channel data 302, active bandwidth data 303, and transmit/receive power data 304 stored respectively in step 204 (S205).

[7] Send all the setup-data retrieved in step 205 to tuner 1 (S206).

The setup-data sent to tuner 1 through a series of above processing will be installed in relevant sections by first controller 105 of tuner 1.

The operation is described next with reference to the flowchart.

Figure 7:
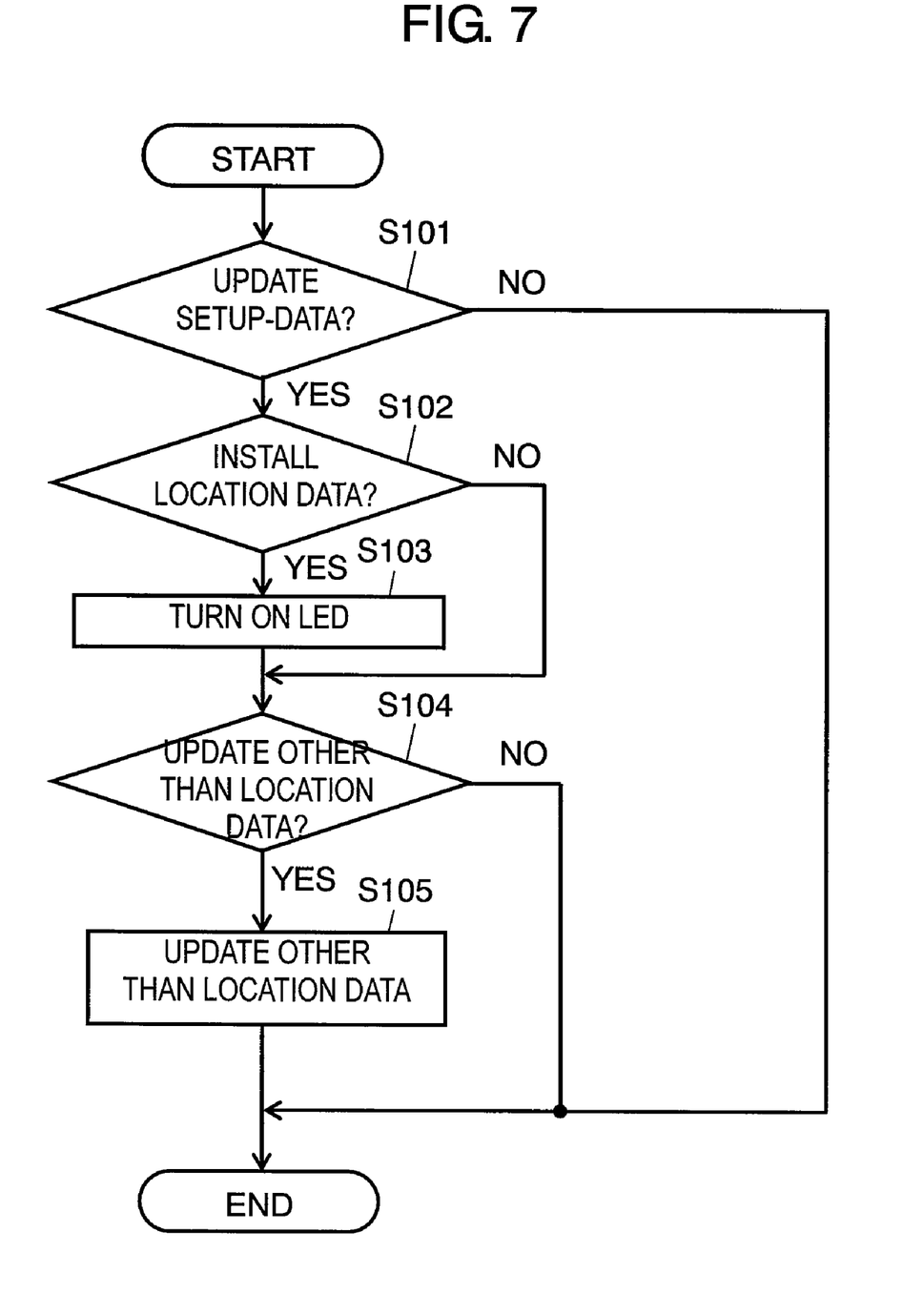
FIG. 7 shows a flowchart on setup-data executed in the tuner of the television receiving system used in preferred embodiment 1 of the present invention.

FIG. 7 shows a flowchart on the setup-data executed in the tuner of the television receiving system used in preferred embodiment 1 of the present invention.

[1] Check whether setup-data 3 in tuner 1 should be updated or not (S101). If not, exit from the loop.

[2] If the setup-data is to be updated, check whether location data 301 sent from display 2 has been installed newly or not (S102). If location data 301 has not been newly installed, go to step 104.

[3] If location data 301 sent from display 2 has been installed newly, location data 301 is reflected on LED indicator 104. For instance, an LED turns on indicating a new location (S103).

[4] Additionally, check whether the configuration parameters on wireless signal control in setup-data 3 should be updated or not (S104). If the configuration parameters on wireless signal control are not to be updated, exit from the loop.

[5] When the configuration parameters on wireless signal control are updated, first controller 105 will install active wireless channel data 302, active bandwidth data 303 and transmit/receive power data 304 in relevant sections (S105).

By executing the above processing, the television receiving system capable of installing an optimum setting for wireless transmission can be provided using a plurality of setup-data 3 which can be selected to install by a user personally.

Exemplary Embodiment 2

Figure 8:
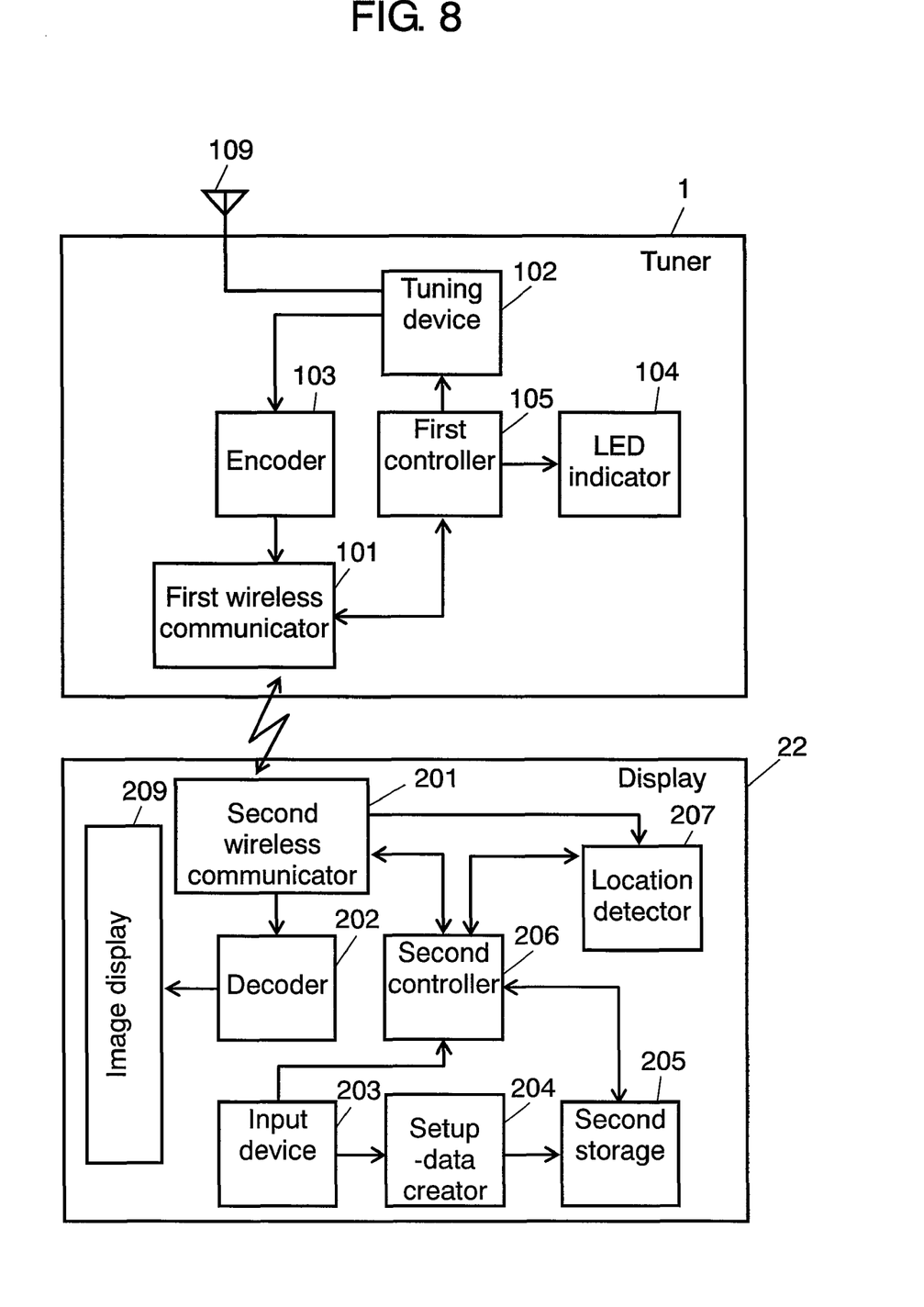
FIG. 8 shows a block diagram of the television receiving system used in preferred embodiment 2 of the present invention.

FIG. 8 shows a block diagram of the television receiving system used in preferred embodiment 2 of the present invention. In FIG. 8, the point different from exemplary embodiment 1 shown in FIG. 2 is that display 22 is provided with location detector 207 to detect the location of display 22. Monitoring the communication condition of second wireless communicator 201, location detector 207 detects changes in configuration parameters installed previously as a current data. For instance, power consumption for transmit/receive in second wireless communicator 201, which is one of the current data, is detected to have become higher than the parameter installed previously. If the detected value is over a predetermined value, location detector 207 sends the result to second controller 206. In response to this, second controller 206 selects an optimum value for setup-data 3.

The operation is described next with reference to the flowchart.

Figure 9:
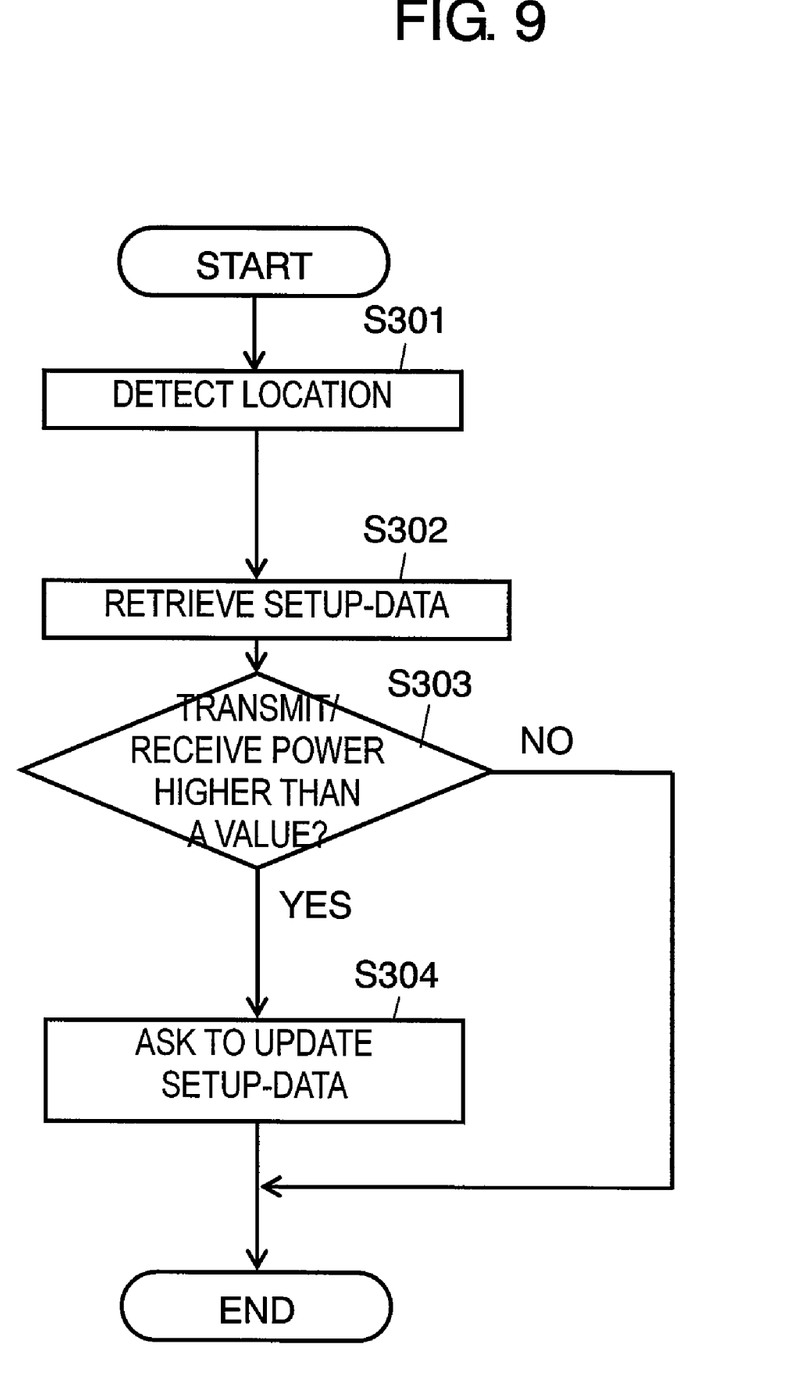
FIG. 9 shows a flowchart on location detection executed in the display of the television receiving system used in preferred embodiment 2 of the present invention.

FIG. 9 shows the process flowchart on location detection executed in the display of the television receiving system used in preferred embodiment 2 of the present invention.

[1] A detection program is always executed in location detector 207 to detect the location of display 22 (S301). Specifically, an amount of power actually consumed to transmit/receive signals, which is one of current data, is calculated.

[2] Retrieve transmit/receive power data 304 installed currently, which is one of setup-data 3 (S302).

[3] Compare the amount of retrieved transmit/receive power data 304 with the amount of actual transmit/receive power (S303). If the difference is lower than a predetermined value, exit from the loop.

[4] If the difference is higher than the predetermined value, ask the user to update the setup-data installed currently (S304). Specifically, inform the user of the request by changing the indication of control-panel of display 22 (for instance, by flashing the entire indications in FIG. 4).

As described above, by providing display 22 with location detector 207 and executing the above processing, users can be informed of the wireless communication condition to reinstall an optimum setup-data immediately.

Exemplary Embodiment 3

Figure 10:
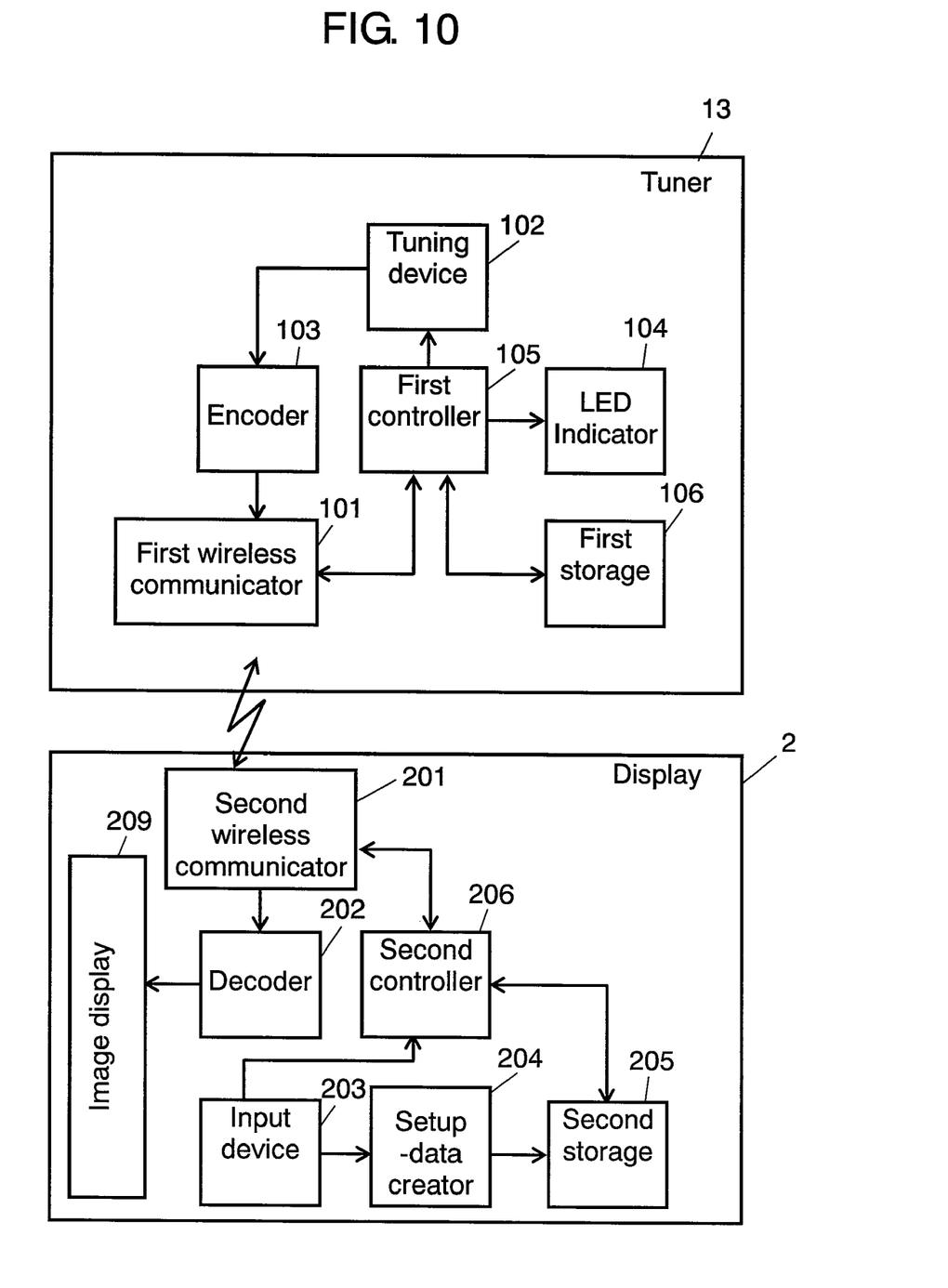
FIG. 10 shows a block diagram of the television receiving system used in preferred embodiment 3 of the present invention.

FIG. 10 shows a block diagram of the television receiving system used in preferred embodiment 3 of the present invention. In FIG. 10, the point different from exemplary embodiment 1 shown in FIG. 2 is that tuner 13 is provided with first storage 106.

First storage 106 stores setup-data 3 sent from display 2. Even after setup-data 3 is updated, previous setup-data 3 remains being not deleted, so that a plurality of setup-data 3 installed in the past can be used also afterward.

Specifically, when display 2 loses wireless contact with tuner 13, display 2 and tuner 13 change setup-data 3, that have already been stored, each in a different cycle respectively and install just the setup-data 3 permanently at the time when the lost contact is restored and established again. This operation can restore the lost wireless contact automatically.

The operation is described next with reference to the flowchart.

Figure 11:
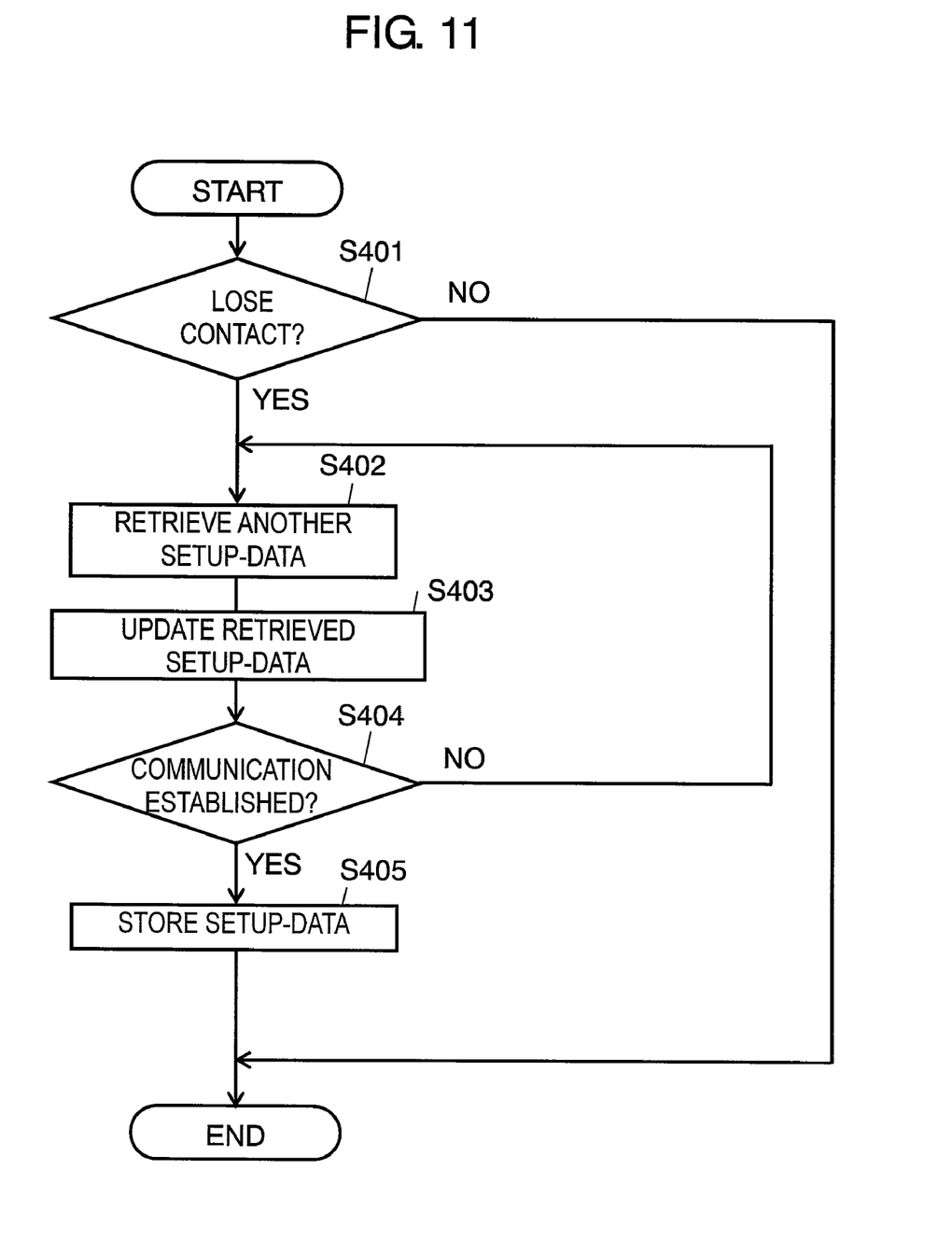
FIG. 11 shows a flowchart on restoration of wireless communication executed in the display and tuner of the television receiving system used in preferred embodiment 3 of the present invention.

FIG. 11 shows a program flowchart executed to restore wireless communication in the display and tuner of the television receiving system used in preferred embodiment 3 of the present invention. The program processing shown in FIG. 11 is executed at the same time in a different cycle in both display 2 and tuner 13.

[1] Check whether display 2 has lost wireless contact with tuner 13 or not (S401). If the wireless contact has not been lost, exit from the loop.

[2] If the wireless contact has been lost, display 2 retrieves another setup-data 3 from second storage 205. Additionally, tuner 13 retrieves another setup-data 3 from first storage 106 (S402).

[3] Next, display 2 updates setup-data 3 retrieved from second storage 205 to change settings of relevant sections of display 2. Similarly, tuner 13 updates setup-data 3 retrieved from first storage 106 to change settings of relevant sections of tuner 13 (S403).

[4] Display 2 and tuner 13 respectively check whether the lost communication has been restored or not (S404). If the communication has not restored, return to step S402 to retrieve still another setup-data 3 (S405).

[5] When the communication is established, setup-data 3 used at the time is installed permanently.

By allowing display 2 and tuner 13 to perform the above described processing in a different cycle, all combinations for setup-data 3 of display 2 and setup-data 3 of tuner 13 can be checked. If the communication is not established in a given amount of time, processing may be forced to exit from the loop. In this occasion, a message should be shown saying that communication could not be established in display 2.

By executing the above processing, the television receiving system is realized that can restore a lost communication automatically even if display 2 loses wireless contact with tuner 13.

INDUSTRIAL APPLICABILITY

The television receiving system of the present invention can avoid interference on wireless communication caused by harmonic wave possible to occur in BS/CS channel tuning under different conditions within an area capable of communicating by wireless with tuner located in a house, garden or the like. Therefore, the system is useful as the television receiving technology to receive and utilize broadcast signals such as television broadcasting via wireless transmission.

The invention claimed is:

1. A television receiving system comprising:
an antenna to receive a broadcast signal;
a tuner including:
   a tuning device to tune the broadcast signal received by the antenna,
   an encoder to encode the broadcast signal tuned by the tuning device,
   a first wireless communicator to transmit the broadcast signal encoded by the encoder as a wireless signal based on setup-data, and
   a first controller to configure the first wireless communicator with the setup-data; and
a display including:
   a second wireless communicator to receive the broadcast signal from the first wireless communicator,
   a decoder to decode broadcast signal received by the second wireless communicator,
   an image display device to display the broadcast signal decoded by the decoder as an image,
   an input device to input a user's command,
   a setup-data creator to create the setup-data which includes desired transmission parameters of the first wireless communicator according to the user's input command, the desired transmission parameters including transmit/receive power data indicating a transmit/receive power consumed in the wireless channel,
   a second storage to store the setup-data created; and
   a second controller to retrieve the setup-data from the second storage and send it to the first controller via the second wireless communicator and the first wireless communicator,
wherein the first controller configures the first wireless communicator with the setup-data sent from the second controller, and
wherein the display further comprises a location detector operable to detect the transmit/receive power data consumed in the second wireless communicator, and to obtain a difference between the detected transmit/receive power data and the transmit/receive power data included in the desired transmission parameters, and if the difference is higher than a predetermined value, the display requests the user to update the desired transmission parameters.

2. The television receiving system of claim 1, wherein the tuner further comprises an LED indicator and the first controller controls the LED indicator according to the setup-data.

3. The television receiving system of claim 2, wherein the setup-data further includes:
location data showing a position where the display is located;
active wireless channel data for use between the first wireless communicator and the second wireless communicator; and
active bandwidth data showing a bandwidth actually used in the wireless channel.

4. The television receiving system of claim 3, wherein
the location detector detects a current data of the display,
the second controller compares a setup-data stored in the second storage with the current data to update the setup-data with the current data.

5. The television receiving system of claim 4, wherein the current data is a transmit/receive power data to show a transmit/receive power consumed in the wireless channel.

6. The television receiving system of claim 2;
wherein the tuner further comprises a first storage for storing a plurality of setup-data previously installed; and
when the first wireless communicator loses contact with the second wireless communicator, the first controller retrieves a plurality of setup-data stored in the first storage in due order, and the second controller retrieves a plurality of setup-data stored in the second storage in due order to set an optimum setup-data to restore the communication.

7. The television receiving system of claim 6, wherein
a time cycle when the first controller retrieves a plurality of setup-data stored in the first storage in due order differs from a time cycle when the second controller retrieves a plurality of setup-data stored in the second storage in due order, thus creating a good timing to set an optimum setup-data on the tuner and the display to restore the communication.

* * * * *